(12) United States Patent
Moindron

(10) Patent No.: US 6,462,973 B2
(45) Date of Patent: Oct. 8, 2002

(54) A.C./D.C. CONVERTER THAT AUTOMATICALLY ADAPTS TO THE AMPLITUDE OF THE SUPPLY VOLTAGE

(75) Inventor: Laurent Moindron, Notre Dame d'Oe (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/917,531

(22) Filed: Jul. 26, 2001

(65) Prior Publication Data
US 2002/0012261 A1 Jan. 31, 2002

(30) Foreign Application Priority Data
Jul. 28, 2000 (FR) ............................................. 00 09939

(51) Int. Cl.[7] .......................... H02M 1/12; H02M 1/14; H02M 7/217
(52) U.S. Cl. .......................... 363/127; 363/45; 363/52; 363/84
(58) Field of Search ............................. 363/44, 45, 50, 363/46, 49, 52, 53, 84, 89, 127; 323/901, 908

(56) References Cited

U.S. PATENT DOCUMENTS

| | | | |
|---|---|---|---|
| 3,558,982 A | | 1/1971 | Greenwood .................... 317/20 |
| 4,811,189 A | | 3/1989 | Harvest et al. ................ 363/53 |
| 5,619,127 A | * | 4/1997 | Warizaya ..................... 323/275 |
| 5,822,203 A | | 10/1998 | Peron ......................... 363/125 |
| 5,990,581 A | * | 11/1999 | Ikegami et al. ............. 307/131 |
| 6,246,596 B1 | * | 6/2001 | Yamazaki ..................... 363/49 |

FOREIGN PATENT DOCUMENTS

EP 0 671 867 B1 9/1995

* cited by examiner

*Primary Examiner*—Bao Q. Vu
(74) *Attorney, Agent, or Firm*—Lisa K. Jorgenson; E. Russell Tarleton; Seed IP Law Group PLLC

(57) ABSTRACT

An A.C./D.C. converter including a filtering capacitor and further including a first branch essentially including a first rectifying circuit and a current limiting circuit; a second branch essentially including a second rectifying circuit, the series voltage drop of which is limited to that of the switches forming it; and a selection circuit for selecting one of the two rectifying circuits.

19 Claims, 2 Drawing Sheets

A.C./D.C. CONVERTER THAT AUTOMATICALLY ADAPTS TO THE AMPLITUDE OF THE SUPPLY VOLTAGE

TECHNICAL FIELD

The present invention generally relates to A.C./D.C. converters including a rectifying element and a filtering element, and more specifically to the protection of loads of such converters against current peaks.

BACKGROUND OF THE INVENTION

FIG. 1 schematically illustrates by functional blocks a conventional example of such a converter. A source 1 of a high A.C. voltage Vac supplies a load 2 via a rectifying means 3 and a filtering capacitor CF. Capacitor CF and load 2 are connected in parallel between two rectified output terminals of rectifying means 3, and two A.C. input terminals are connected across source 1.

The embodiments of the present invention will be discussed in relation with a rectifying means 3 of fullwave type. However, the present invention also applies to rectifications of halfwave type or others for which the principles and problems discussed hereafter are also encountered.

The operation of the converter of FIG. 1 is the following. As long as voltage Vac provided by source 1 is greater—in absolute value—than the rectified and filtered voltage VL across capacitor CF, source 1 supplies load 2 and capacitor CF charges. As soon as voltage Vac becomes smaller than voltage VL, rectifying means 3 is invalidated, generally automatically, and isolates its A.C. input terminals from its rectified output terminals. Load 2 is then supplied by the discharge of capacitor CF until the supply voltage Vac again becomes greater than the rectified and filtered voltage VL.

A disadvantage of such conventional A.C./D.C. converters is the transmission, by rectifying means 3, of possible current peaks appear, for example, upon the first powering-on or after microfailures of the power supply. "Microfailure" is used to designate supply interruptions of a duration such that capacitor CF discharges to a level much lower than the mean steady state level. Since the converter generally is sized for a released power adapted to the load, such a phenomenon typically occurs for failures lasting for more than one period of the A.C. power supply (for example, 20 ms for a 50-Hz power supply).

To overcome this disadvantage, various approaches have been provided.

A first approach consists of sizing capacitor CF and load 2 according to such current peaks. This is not desirable, since it imposes the use of relatively bulky components. Further, this is not possible with all loads.

A more recent approach typically provides, as illustrated by dotted lines in FIG. 1, a device 4 of current limitation between source 1 and rectifying means 3. Device 4 can be made in several ways. Generally, it is a resistor with a negative temperature coefficient, or NTC resistor. Such an NTC resistor has, when cold, a very high resistance. Under the effect of the current flowing therethrough, it heats up and its resistance decreases. Such a device thus enables efficient reduction of the transmission of current peaks upon the first circuit power-on. However, in case of an incidental interruption of the power supply for a very short duration, the NTC resistor does not have time to cool down and cannot accordingly limit the current when the power supply reappears.

To solve this problem, limiting devices adapted to avoiding the transmission of current peaks after a microfailure have been developed. A first solution consists of replacing the NCT resistor with a fixed resistor in parallel with a controllable switch such as a triac or a relay. In steady state, with a substantially constant current, the triac or relay short-circuits the resistor. In transient phases, the triac or relay is open and the current flowing to capacitor CF and load 2 is limited by the fixed resistor. However, such devices have disadvantages in terms of response rapidity, increase of the power dissipation, and bulk. For example, a relay device imposes a relatively complex and highly dissipative control circuit and uses signals external to the device or to the converter, as well as an auxiliary low-voltage power supply.

It has also been provided to charge capacitor CF progressively by using a phase angle charge circuit. Such a circuit enables only triggering the capacitor charge when voltage Vac is greater than voltage VL by a determined threshold, generally of a few tens of volts. This relatively efficient system however also has implementation disadvantages, especially in terms of bulk. Further, like a relay device, it requires an additional control circuit and low-voltage power supply.

SUMMARY OF THE INVENTION

The embodiments of the present invention provide a novel A.C./D.C. converter that is directed to avoiding the transmission of current peaks to the load.

The converter has a reduced power loss, and in one embodiment an autonomous converter is provided, that is, does not imply use to an additional power supply. In accordance with another aspect of the present invention, an automatic converter is provided that does not require the use of signals external to the very converter. In accordance with another aspect of the present invention, a converter that automatically adapts to the amplitude of the supply voltage is provided.

The embodiments of the present invention provide an A.C./D.C. converter including a filtering capacitor, a first branch essentially including a first rectifier and a current limiter; a second branch essentially including a second rectifier, the series voltage drop of which is limited to that of the switches forming it; and a selection circuit for selecting one of the two rectifiers.

According to another embodiment of the invention, the selection circuit is adapted to select the second branch when the interval between the voltage across the filtering capacitor and the maximum value of the supply voltage is smaller than a determined reference value.

According to another embodiment of the present invention, the first branch includes a delayer of the turning-on of the first rectifier with respect to the zero crossing of the interval between the supply voltage and the rectified and filtered voltage, to enable selection of the second branch by the selection circuit.

According to yet another embodiment of the invention, the selection circuit includes a control circuit and a selection switch interposed between an output of the first rectifier and a terminal of control of at least one switch associated with the second branch.

According to a further embodiment of the invention, the control circuit includes a peak detector of the maximum level of the non-attenuated supply voltage, and a resistive divider adapted to determining the determined reference value.

According to still yet another embodiment of the invention, the switch of the second branch is a one-way switch constitutive of the second rectifier.

According to a further embodiment of the invention, the converter is of fullwave type, the first rectifier is a diode bridge and the second rectifier being a composite bridge, the two branches of which each include a diode and a controllable switch, the two diodes of the second rectifier being recirculation diodes shared with the first rectifier.

According to another embodiment of the invention, the delayer is a cathode-gate thyristor, the anode of which is connected to an output terminal of the current limiter, the cathode of which is connected to a terminal of a filtering capacitor, and the gate of which is brought back to the anode via a zener diode having its anode connected to the cathode gate of a thyristor.

According to yet a further embodiment of the invention, the selection switch is formed of a first transistor having a first power terminal, connected to an output terminal of the limiter, which forms a first input terminal of the selection circuit, a second power terminal connected to control terminals of input or output switches of the second rectifier, which forms the output of the selection circuit, and a control terminal connected to a first power terminal of a second transistor of the same type as the first transistor, a second power terminal of the second transistor connected to the output of the first rectifier forming a second input terminal of the selection means and a control terminal of the second transistor forming the control terminal of the switch receiving a control signal from the control circuit.

According to still yet another embodiment of the invention, the current limiter is connected between an output terminal of the first rectifier and a first rectified voltage terminal of the filtering capacitor.

BRIEF DESCRIPTION OF THE DRAWINGS

The foregoing features and advantages of the disclosed embodiments of the invention will be discussed in detail in the following non-limiting description in connection with the accompanying drawings, wherein.

DETAILED DESCRIPTION OF THE INVENTION

For clarity, identical elements have been designated in the different drawings by identical references.

Figure 1:
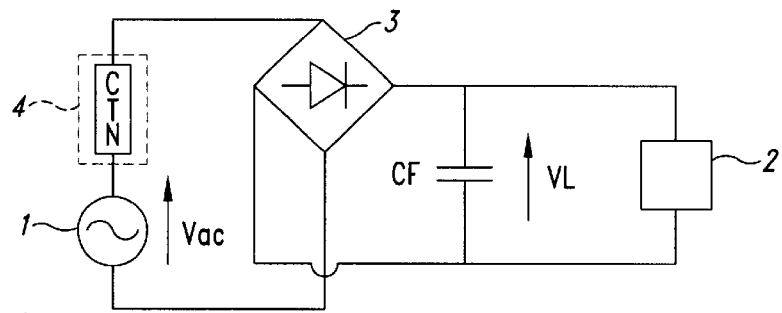
FIG. 1 schematically illustrates an A.C./D.C. converter according to the state of the art.
Figure 2:
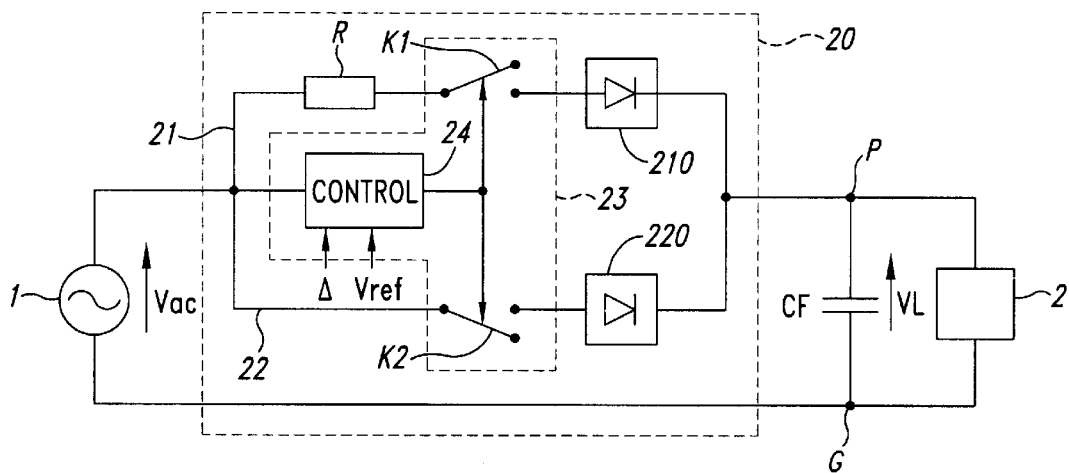
FIG. 2 illustrates in the form of a functional block diagram an A.C./D.C. converter according to an embodiment of the present invention.

FIG. 2 illustrates, in the form of a functional block diagram, an A.C./D.C. voltage converter according to the present invention. A source 1 of a high A.C. voltage Vac, for example, a 110- or 220-volts main voltage, supplies a load 2 via a converter formed of a rectifying circuit 20 and of a filtering capacitor CF. Capacitor CF is placed in parallel with load 2 between positive rectified voltage output and reference nodes P and G of circuit 20.

A feature of the present invention is to provide in the rectifying circuit 20 two branches 21 and 22 adapted to each individually performing the desired rectification. In other words, each branch 21 or 22 enables, as taken individually in the absence of the other branch 22 or 21, obtaining the desired rectified voltage. Thus, if rectifying circuit 20 is of halfwave type, each of branches 21 and 22 forms a halfwave rectifying circuit. However, each branch 21 and 22 will have to be able to perform a fullwave rectification by itself if rectifying circuit 20 is of fullwave type. Such a doubling does not increase the converter complexity, but it does increase its performances.

According to the disclosed embodiment of FIG. 2, the first branch 21 includes a current limiting means, for example a fixed reistor R. Second branch 22 includes no current limiting means. Branches 21 and 22 also each include first and second rectifiers 210 and 220, for example formed of switches (the simpler being diodes). Both the first and second rectifiers 210 and 220 can ensure the same type of rectification (halfwave or fullwave). The second branch 22 exhibits, across its terminals, a minimized series voltage drop, for example reduced to that of the switches forming the rectifier 220. Rectifying ciruit 20 also includes a selection circuit 23 adapted to selecting a single one of the two branches 21 and 22 to provide the rectified output voltage, between terminals P and G where load 2 and filtering capacitor CF are connected in parallel.

The seletion circuit 23 enables selecting, in an autonomous and automatic manner, the second branch 22 is steady state and, during a transient phase with current peaks, the first branch 21. The selection circuit 23 is functionally shown in FIG. 2 by a control circuit 24 of the two switches K1 and K2 is inserted in one of branche 21 and 22 in series with the corresponding the first and second rectifiers 210 and 220.

Figure 3:
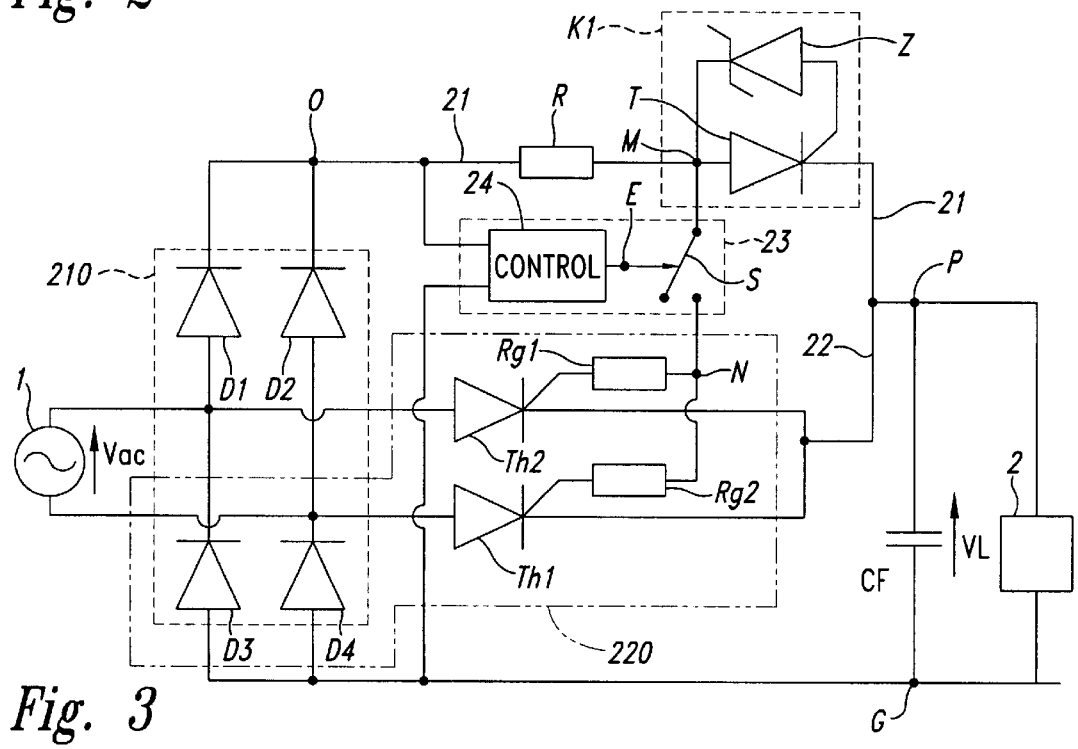
FIG. 3 illustrates an embodiment of the circuit of FIG. 2.
Figure 4:
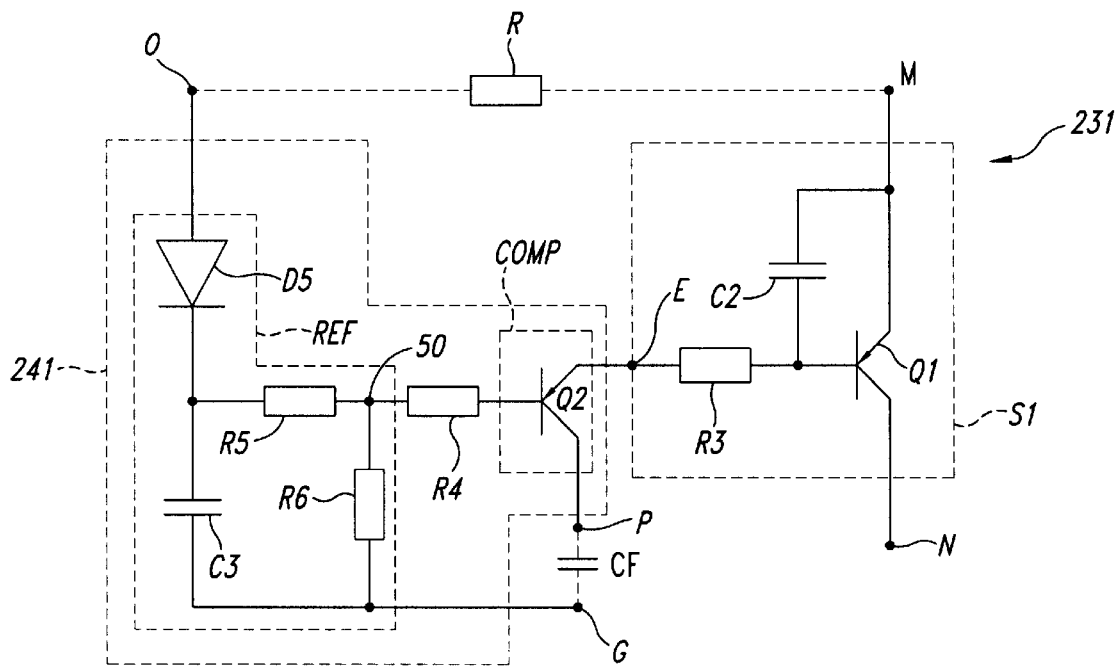
FIG. 4 schematically illustrates an embodiment of a selection circuit included by the converter of FIG. 3.

The operation of the control circuit 24 will be studied hereafter in further detail in relation with FIGS. 3 and 4. Circuit 24 determines the selection of one of branches 21 and 22, that is, the control of the associated switches K1 and K2, based, on the one hand, on an interval Δ between the current charge level VL of capacitor CF and on peak voltage Vacmax and, on the other hand, on a reference value Vref. Both signals β and Vref are determined autonomously, that is, internally to the converter.

Switches K1 and K2 may be elements forming one or the other of two the first and second rectifiers 210 and 220, as well as switches physically separate from the first and second rectifiers 210 and 220. Further, one of switches K1, K2 may be an element autonomous from control circuit 24, such as, for example, a delayer of the selection of the corresponding branch 21, 22. Preferably, switch K1 delays the turning-on of first branch 21. More specifically, as will be discussed in further detail hereafter, switch K1 raises the level of the automatic triggering voltage of the first rectifier 210 with respect to its natural triggering level.

FIG. 3 illustrates a specific embodiment of the present invention applied to a fullwave-type rectification.

First rectifier 210 is formed of a diode bridge. The two input diodes, having their anodes respectively connected to one of the terminals of source 1, will be designated hereafter as D1 and D2. Their cathodes are interconnected at a node O which forms the positive output of rectifier 210. The recirculation diodes of the bridge having their interconnected anodes defining reference terminal G of the rectified voltage are designated by D3 and D4. More specifically, recirculation diode D3 is associated with diode D1, while diode D4 is associated with diode D2. Current limiting resistor R is interposed between output O of bridge 210 and a first power terminal M of a delayer K1. A second power terminal of delayer K1 forms the output of the first branch 21 and is connected to node P.

Delayer K1 includes a cathode-gate thyristor T and a zener diode Z. Anode M of thyristor T is connected to the terminal of limiting resistor R opposite to output O of the first rectifier 210. Its cathode is connected to node P. The anode of zener diode Z is connected to the gate of thyristor T. The cathode of zener diode Z is brought to anode M of thyristor T. Accordingly, the turning-on of thyristor T is automatically performed as soon as the voltage thereacross exceeds the threshold set by diode Z. Zener diode Z, conversely to an auxiliary power supply, thus provides no power. It is used to set the turn-on delay of delayer K1 with respect to the time of each halfwave at which supply voltage Vac becomes greater—in absolute value—than charge level VL of capacitor CF.

Second rectifier 22 is formed of a composite bridge including two diodes and two cathode-gate thyristors Th1 and Th2. Thyristors Th1 and Th2 both form a portion of the second rectifier 22 and switch K2 of FIG. 2. Their gates are interconnected, via respective limiting resistors Rg1 and Rg2, to a same output N of selection circuit 23. Preferably, both thyristors Th1 and Th2 are the input elements of the bridge, their anodes being respectively connected to one of the terminals of source 1. The output of the second rectifier 220, formed by the common cathode node of thyristors Th1 and Th2, is connected to node P. Preferably, recirculation diodes D3 and D4 of the diode bridge also form the recirculation elements of the composite bridge. No additional connection is then required with respect to those described hereabove to obtain the first and second rectifiers 210 and 220. Further, a rectified voltage reference terminal G common to both branches 21 and 22 of the complete rectifying circuit 20 is thus available.

Selection circuit 23 includes control circuit 24 and a selection switch S. Selection switch S enables validating a one-way current path from node M of first branch 21 to node N of control of switch K2. In other words, a first power terminal of selection switch S is interposed between current limiting means R and delayer K1. A second power terminal of selection switch S is connected to the common connection node of respective limiting resistors Rg1 and Rg2 of thyristors Th1 and Th2. Control circuit 24 provides a signal of control of selection switch S according to the charge state of capacitor CF. More specifically, the provided control depends on a comparison, with respect to a fixed reference Vref, of interval Δ between output voltage VL with the maximum voltage or peak voltage Vacmax of source 1. The determination of reference level Vref as well as the comparison are performed autonomously, without requiring any reference and/or supply signals external to rectifying circuit 20. Such an autonomy is obtained by using, to establish reference level Vref and/or perform the comparison and/or the supply of the elements of circuit 24, rectified voltage and/or rectified and filtered voltage signals only. This is illustrated in FIG. 3 by the connection of a first input terminal of control circuit 24 to the positive rectified output terminal O of the first rectifier 210 and of a second input terminal of control circuit 24 to an electrode of filtering capacitor CF (to reference terminal G).

As long as supply voltage Vac is smaller—in absolute value—than voltage VL across filtering capacitor CF, the first and second rectifiers 210 and 220 are automatically invalidated. Indeed, according to the sign of the halfwave, the junction of one of the recirculation diodes D3 or D4 of the first and second rectifiers 210 and 220 is reverse biased, and so is the junction of input element D2, Th2 or D1, Th1 associated with the other recirculation diode D4 or D3. The A.C. input terminals of rectifying circuit 20 are then isolated from its rectified output terminals P and G. Load 2 is supplied by the discharge of capacitor CF.

When supply voltage Vac is greater—still in absolute value—than voltage VL across filtering capacitor CF, the operation depends on the charge level thereof and is controlled by selection circuit 23.

As soon as voltage Vac becomes greater—in absolute value and neglecting the voltage drop in current limiting means R—than voltage VL, one of diodes D1 or D2 turns on. The rectified voltage O at the output of first rectifier 210 follows supply voltage Vac. The same occurs for the voltage across limiting resistor R. Control circuit 24 then compares, with a maximum reference voltage Vref, the interval Δ between charge level VL of capacitor CF and peak voltage V1max. In other words, control circuit 24 compares the charge state of capacitor CF with a given minimum level allowed in steady state.

If the interval Δ is greater than the reference value Vref, the charge of capacitor CF is smaller than the minimum allowed level. Current peaks risk occurring and control circuit 24 drives selection switch S so that it remains open. Thyristors Th1 and Th2 thus remain off, their respective gates being "in the air". The voltage across delayer K1 increases, following the variation of voltage Vac, to reach the threshold of zener diode Z. Once this threshold has been reached, a gate current occurs and thyristor T triggers. The rectification is then performed in branch 21.

If the interval Δ is smaller than or equal to reference value Vref, the charge of capacitor CF is at least equal to the minimum allowed value. Control circuit 24 then drives selection switch S so that it turns on. The voltage across delayer K1 increases, following the variation of voltage Vac and an increasing gate current is applied, to thyristors Th1 and Th2, via switch S. Then, one of thyristors Th1 or Th2 triggers. The rectification is performed via second branch 22.

The triggering of thyristor Th1 or Th2 is performed as soon as the gate current has reached and exceeded a value and duration determined by the characteristics specific to each of the thyristors and which only depend on their manufacturing conditions. As it is turned on, thyristor Th1 or Th2 short-circuits limiting resistor R and the control circuit formed of switch S and of resistor Rg1 or Rg2. The duration of application of the control pulse on the gates of these thyristors is thus reduced to the minimum value imposed by the sole thyristor structure technological constraints.

To avoid conflict in a steady state, a zener diode Z having a sufficiently high threshold to prevent triggering of thyristor T, once the charge of capacitor CF has exceeded the allowed minimum level for a sufficiently long time to ensure the triggering of one of thyristors Th1 or Th2, should be chosen. The function of delayer K1 is to delay the selection of first branch 21 to enable selection of second branch 22 in steady state.

The rectifying circuit 20 has various advantages as compared to prior art circuits, which appear from the foregoing description.

In a steady state, the power dissipation is reduced to the sole dissipation of active elements Th1 and D3 or Th2 and D4 of second branch 22. This dissipation is negligible when compared to that introduced by an NTC resistor or by a short-circuit of triac type.

Further, the power dissipated during the triggering of thyristor Th1 or Th2 in resistors R and Rg1 and Rg2 is negligible. Indeed, on the one hand, it is extremely low as compared to the power dissipated in a conventional short-circuit circuit. On the other hand, as has been previously discussed, the duration and level of the control pulse are automatically adjusted to the required minimum values. On the contrary, the controls of prior short-circuit devices of relay and triac type had to be permanent.

In the event of an interruption of the supply voltage in steady state, rectifying circuit 20 automatically resets by opening all the switches. When power supply Vac is reestablished, the selection circuit 23 automatically determines which branch to use according to current peak risks, that is, to the charge state of filtering capacitor CF.

Figure 5:
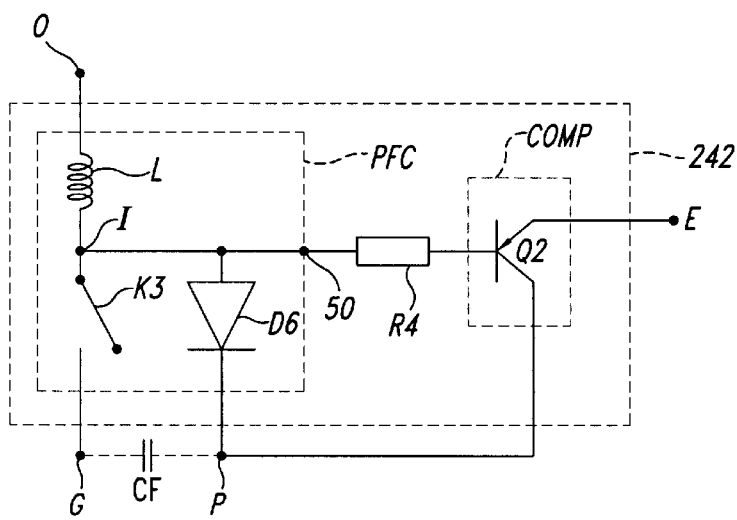
FIG. 5 illustrates an alternative embodiment of a control circuit formed in the selection circuit of FIG. 4.

It is further possible to form selection circuit 23 by autonomous means, that is, requiring no auxiliary power supply. FIGS. 4 and 5 illustrate examples of a selection switch S and of control means 24 useable in the embodiment of FIG. 3, which are autonomous and adapted to ensuring the previously-described desired operation.

FIG. 4 illustrates a complete embodiment of a selection circuit useable in the circuit of FIG. 3. As a non-limiting example, a selection circuit 231 essentially including a selection switch S1 controllable by a current is considered. The associated control circuit 241 is then adapted to providing a current control.

Switch S1 is formed of a PNP-type bipolar transistor Q1, the emitter and the collector of which form the first and second power terminals M and N of switch S1. The base of transistor Q1 is connected, via a protection resistor R3 (current limiting), to control terminal E of selection switch S1. Preferably, the base and the emitter of transistor Q1 are interconnected by a capacitor C2. Capacitor C2 smoothes, if present, a high-frequency control signal (base current) provided by control circuit 241.

Control circuit 241 associated with a selection switch controllable by a current, such as previously-described switch S1, includes a circuit REF adapted to determining a reference value Vref and a comparator COMP.

Comparator COMP is used to compare reference Vref with the current charge level VL of filtering capacitor VF, and to provide a control signal to selection switch S1. If the current charge level VL is greater than reference Vref provided by reference circuit REF, comparator COMP closes switch S1. Comparator COMP is, for example, a second PNP-type bipolar transistor Q2. The collector of transistor Q2 is connected to node P. The emitter of transistor Q2 forms the output of control circuit 241, connected to terminal E. The base of transistor Q2 is connected to the output of circuit REF. As an alternative, a voltage-control switch S1 and comparator COMP, for example, P-type MOS transistors, may be provided.

Circuit REF includes a detector of peak value Vacmax, formed of a capacitor C3 and of a diode D5. Detector C3-D5 is connected between rectified output terminals O and G of the first rectifier 210. Diode D5 is interposed between node O and capacitor C3 to impose a current flow into the detector from node O. A resistive divider sets the maximum interval Δ allowed between Vac and the charge level VL of filtering capacitor CF. In other words, the reference voltage at output node 50 of circuit REF is equal to the minimum charge level allowed in steady state for filtering capacitor CF. A first resistor R5 of the divider is interposed between the electrode of detection capacitor C3 and output 50. A second resistor R6 of the divider is interposed between output 50 and the other electrode of capacitor C3, connected to node G.

Comparator COMP being a bipolar transistor Q2, and the control signal provided by reference circuit REF being a voltage signal, a voltage-to-current conversion resistor R4 is provided between output 50 and the base of transistor Q2.

The operation of the selection circuit 23 then is the following. It is assumed to start from a quiescent initial state in which filtering capacitor CF and peak detector capacitor C3 are both completely discharged (VCF=VC3=0), all switches in the circuit being off.

From the starting of source 1, an A.C. voltage Vac is applied to the A.C. input terminals of the two blocked the first and second rectifiers 210 and 220. No control being applied, composite bridge 220 remains blocked. As soon as the thresholds of junctions Vj of the appropriate diode pair D1, D3 or D2, D4 of the simple bridge and of diode D5 of the peak detector have been exceeded (Vac≧[Vj(D1/D2)+ Vj(D3/D4)+Vj(D5)]), capacitor C3 charges for the rest of the first halfwave of A.C. voltage Vac. The capacitance of capacitor C3 is very small to limit the overcurrent induced by its charge. The voltage at output node 50 of the reference circuit increases, following the charge level of capacitor C3. The capacitor being discharged, second transistor Q2 remains off, its base-collector junction being reverse-biased.

As soon as supply voltage Vac exceeds the sum of the series voltage drops of the first rectifier 210, of the voltage drop across terminals O and M of resistor R and of the threshold of delayer K1, said delayer becomes conductive and capacitor CF starts charging.

During the next half-halfwave of decrease of supply voltage Vac, filtering capacitor CF discharges into load 2. However, capacitor C3 of the detector remains at a substantially constant charge level. Indeed, its possible discharge paths all include at least one reverse-biased junction. Its discharge is limited to the leakage currents of these junctions.

This operation continues until the charge of capacitor CF reaches the reference value, that is, the output voltage of resistive bridge R5–R6, and exceeds it by the value of the voltage drop of conversion resistor R4. Then, if the voltage at node M (that is, the rectified supply voltage Vac, minus the voltage drop across limiting resistor R) exceeds charge level VL by the voltage drop across resistor R3, transistor Q2 turns on. This turning-on selects the second branch 22 by turning on transistor QI and thus creating a control current on terminal N of switch K2.

Then, upon each halfwave, during the delay (determined by diode Z) of automatic selection of first branch 21, comparator Q2 compares charge level VL of filtering capacitor CF with the fixed reference. As long as this charge level is greater than or equal to this reference, transistor Q2 turns on and causes the turning-on of transistor Q1 as soon as the voltage at node M reaches and exceeds the required level. Second branch 22 is selected. Delayer K1 must thus provide a delay greater than the series voltage drops to be compensated for by the voltage at node M to turn on transistors Q1 and Q2 and switch K2.

If filtering capacitor CF is discharged below a minimum charge level, comparator Q2 remains off and no control pulse is transmitted. First branch 21 is then selected.

The operation of circuit 241 is thus autonomous and automatic. Further, it is faster than existing devices. Moreover, circuit 241 is particularly advantageous in that peak detector C3–D5 automatically adapts to the peak level of the power supply. This enables its use in mobile devices intended for being able to operate under several supply voltages without using transformers.

FIG. 5 illustrates an alternative embodiment of a control circuit 242 for controlling, in steady state, the turning-on of a current-control selection switch such as switch S1 of FIG. 4.

More specifically, control circuit 242 of FIG. 5 differs from control circuit 241 of FIG. 4 by a construction different from reference circuit PFC. Comparison circuit COMP is identical.

Circuit PFC is a power factor correction circuit formed of a switched inductance L, controlled by a series switch K3. Inductance L and switch K3 are interposed between nodes O (positive rectified voltage output of the first bridge 210 not attenuated by limiting resistor R) and G (rectified voltage reference terminal of rectifying circuit 20). The midpoint I of circuit PFC forms its output connected, via a diode D6, to terminal P of filtering capacitor CF. Midpoint I of circuit PFC is connected to the control terminal of comparator Q2 via converter R4. The control of switch K3 is performed by any known means. For example, if switch K3 is a MOS transistor, a circuit sold by the present applicant and known under trademark L4981A may be used.

Like any power factor correction circuit, switch R3 is only controlled when filtering capacitor CF is sufficiently charged, that is, from the minimum allowed steady state value. As soon as switch K3 is on, assuming the voltage at node M to be sufficiently high to compensate for series voltage drops, a current is extracted from the base of comparison transistor Q2. Selection transistor Q1 (not shown in FIG. 5) is controlled to be turned on and a turn-on control pulse is transmitted to switch K2. Such a control circuit 242 imposes no use of an auxiliary power supply. It draws its power supply from the rectified power supply itself, between nodes O and P. Further, it uses no external signal to set the reference. It is thus autonomous. Moreover, circuit 242 is faster than prior systems.

Of course, the described embodiments are likely to have various alterations, modifications, and improvements that will readily occur to those skilled in the art. In particular, the various embodiments have been non-limitingly discussed. Those skilled in the art will know how to choose, according to the application, elements adapted to implementing the principle of the present invention. Thus, those skilled in the art will known how to modify the elements of the first and second rectifying means. For example, if a halfwave rectification is desired, the diode bridge of FIG. 3 may be replaced with a single diode and the composite bridge may be replaced by a single thyristor. Similarly, it has been chosen to use a first limiting branch, the rectifying means of which starts automatically (diode bridge) and a second branch, the rectifying means of which includes elements triggered under control. Other options are possible. Thus, rectifying circuits both including elements triggered under control may be used. The control circuit will then be adapted to controlling the triggering of one or the other. There may also be two automatically starting means, the selection of a single branch being performed by an asymmetrical control of selection switches placed in each of the branches.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An A.C./D.C. converter, comprising:
a filtering capacitor;
a first branch essentially including a first rectifier and a current limiting means;
a second branch essentially including a second rectifier, a series voltage drop of which is limited to that of a plurality of switches, the first and second branches each configured to individually perform rectification; and
means of selection of one of the first and second branches.

2. The converter of claim 1, wherein the selection means is adapted to select the second branch when the interval between the voltage across the filtering capacitor and the maximum value of the supply voltage is smaller than a determined reference value.

3. The converter of claim 1, wherein the first branch includes a delay means for delaying the turning-on of the first rectifier with respect to a zero crossing of the interval between the supply voltage and the rectified and filtered voltage, for enabling selection of the second branch by the selection means.

4. The converter of claim 3, wherein the selection means includes a control circuit and a selection switch interposed between an output of the first rectifier and a terminal of control of at least one switch associated with the second branch.

5. The converter of claim 2, wherein the control circuit includes a peak detector of the maximum level of the non-attenuated supply voltage, and a resistive divider adapted to determining the determined reference value.

6. The converter of claim 5, wherein the switch of the second branch is a one-way switch constitutive of the second rectifier.

7. The converter of claim 6, wherein the converter is of fullwave type, the first rectifier comprising a diode bridge and the second rectifier comprising a composite bridge, each bridge of which includes a diode and a controllable switch, the two diodes of the second rectifying means comprising recirculation diodes shared with the first rectifying means.

8. The converter of claim 3, wherein the delay means is a cathode-gate thyristor, the anode of which is connected to an output terminal of the current limiting means, the cathode of which is connected to a terminal of the filtering capacitor, and the gate of which is brought back to the anode via a zener diode having its anode connected to the cathode gate of the thyristor.

9. The converter of claim 4, wherein the selection switch is formed of a first transistor having a first power terminal, connected to an output terminal of the limiting means, which forms a first input terminal of the selection means, a second power terminal connected to control terminals of input or output switches of the second rectifier, which forms the output of the selection means, and a control terminal that is connected to a first power terminal of a second transistor of the same type as the first transistor, a second power terminal of the second transistor connected to the output of the first rectifier forming a second input terminal of the selection means and a control terminal of the second transistor forming the control terminal of the switch receiving a control signal from the control circuit.

10. The converter of claim 1, wherein the current limiting means is connected between an output terminal of the first rectifier and a first rectified voltage terminal of the filtering capacitor.

11. A converter circuit, comprising:
first and second rectification branches, the first rectification branch including a current limiter, the second rectification branch comprising a plurality of switches forming a voltage drop, the first and second rectification branches each configured to individually perform rectification;
a selection circuit configured to select the second branch when an interval voltage between a filter capacitor voltage and a maximum value of a supply voltage is smaller than a reference voltage value; and a delay circuit coupled to the first branch and configured to delay turning on of the first branch when the interval voltage value is substantially zero and enable selection of the second branch.

12. The circuit of claim 11, wherein the selection circuit comprises a control circuit and a selection switch interposed between an output of the first branch and a terminal of control of at least one switch associated with the second branch.

13. The circuit of claim 11, wherein the converter is of full wave type, the first branch comprising a diode bridge and the second branch comprising a composite diode bridge, the diode bridge and the composite diode bridge each including a diode and a controllable switch, and the second branch comprising recirculation diodes that are shared with the first branch.

14. A converter circuit, comprising:
a first rectifier branch comprising a resistor, a selection switch, and a diode coupled in series between an input node and an intermediate node;
a second rectifier branch comprising a selection switch and a diode coupled in series between the input node and the intermediate node, the first and second rectifier branch each configured to individually perform rectification;
a filter capacitor coupled between the intermediate node and a ground reference node; and
a control circuit coupled to the input node and to control terminals of the selection switches in the first and second rectifier branches, the control circuit configured to close the selection switch in the second branch when an interval voltage between a filter voltage on the filter capacitor and a maximum value of a supply voltage is smaller than a reference voltage value and otherwise to keep the selection switch in the second branch open and to close the selection switch in the first branch.

15. The circuit of claim 14, further comprising a delay circuit coupled to the first rectifier branch and configured to delay turning on of the first rectifier branch when the interval voltage is substantially zero and to enable selection of the second rectifier branch.

16. The circuit of claim 15, wherein the control circuit comprises a peak detector of the maximum level of the supply voltage and a resistive divider configured to provide the reference voltage value.

17. The circuit of claim 15, wherein the delay circuit comprises a cathode-gate thyristor, the anode of which is connected to the resistor, the cathode of which is connected to a terminal of the filter capacitor, and the gate of which is brought back to the anode via a zener diode having its anode connected to the cathode gate of the thyristor.

18. An A.C./D.C. converter, comprising:
a filtering capacitor;
a first branch essentially including a first rectifier and a current limiting means;
a second branch essentially including a second rectifier, the series voltage drop of which is limited to that of a plurality of switches, the first rectifier comprising a diode bridge and the second rectifier comprising a composite bridge of at least diodes, each bridge of which includes a diode and a controllable switch, the two diodes of the second rectifier comprising recirculation diodes shared with the first rectifier; and
means of selection of one of the first and second branches, the selection means adapted to select the second branch when the interval between the voltage across the filtering capacitor and the maximum value of the supply voltage is smaller than determined reference value, the control circuit including a peak detector of the maximum level of the non-attenuated supply voltage and a resistive divider adapted to determining the determined reference value, and wherein the switch of the second branch is a one-way switch constitutive of the second rectifier, and further wherein the converter is of a full wave type.

19. An A.C./D.C. converter, comprising:
a filtering capacitor;
a first branch essentially including a first rectifier and a current limiting means;
a second branch essentially including a second rectifier, a series voltage drop of which is limited to that of a plurality of switches;
means of selection of one of the first and second branches; and
a delay means included in the first branch for delaying the turning on of the first rectifier with respect to a zero crossing of the interval between the supply voltage and the rectified and filtered voltage for enabling selection of the second branch by the selection means, the delay means comprising a cathode-gate thristor, the anode of which is connected to an output terminal of the current limiting means, the cathode of which is connected to a terminal of the filtering capacitor, and the gate of which is brought back to the anode via a Zener diode having its anode connected to the cathode gate of the thyristor.

* * * * *

UNITED STATES PATENT AND TRADEMARK OFFICE
CERTIFICATE OF CORRECTION

PATENT NO.     : 6,462,973 B2                                            Page 1 of 1
DATED          : October 8, 2002
INVENTOR(S)    : Laurent Moindron It is certified that error appears in the above-identified patent and that said Letters Patent is hereby corrected as shown below:

Column 12,
Line 11, "of at least diodes," should read -- of at least two diodes, --.

Signed and Sealed this

Eighteenth Day of February, 2003

JAMES E. ROGAN
*Director of the United States Patent and Trademark Office*